Patented Dec. 30, 1930

1,787,192

UNITED STATES PATENT OFFICE

AUGUSTUS H. FISKE, OF PROVIDENCE, RHODE ISLAND, ASSIGNOR TO RUMFORD CHEMICAL WORKS, OF PROVIDENCE, RHODE ISLAND, A CORPORATION OF RHODE ISLAND

METHOD OF PURIFYING PHOSPHORIC ACID AND THE LIKE

No Drawing.   Application filed August 11, 1928.   Serial No. 299,106.

My invention relates to certain phases of acid manufacture with particular reference to the purification and the keeping pure of phosphoric acid solutions during the process of cencentration.

It is well known in the art that crude solutions of phosphoric acid should be treated with a soluble sulphide such as hydrogen sulphide in the process of purification to precipitate the sulphides of various elements. There are two stages in the manufacture of phosphoric acid solutions when this is customarily done. The phosphoric acid solution is sometimes treated with hydrogen sulphide or a soluble sulphide before concentration. The sulphides are then removed and the purified dilute phosphoric acid solution evaporated to the proper concentration for further manipulation. If the treatment is performed at this stage in the process of manufacture it is possible that the phosphoric acid solution may become contaminated with further amounts of impurities from the lead containers in which the material is processed. If we follow another method and treat the concentrated phosphoric acid with hydrogen sulphide or a soluble sulphide after concentration, it is well known that the solution in its concentrated form is very corrosive which has a most deleterious effect on the filtering media which may be used to remove the precipitated sulphides. The solution also has a high viscosity in the concentrated form. This viscosity delays to an important extent the process of filtration if filtering mediums are attempted and at the same time this same viscosity delays the settling of the solid sulphides from the solution if it is attempted to remove them by settling.

My invention consists in the addition of hydrogen sulphide or a soluble sulphide to the dilute phosphoric acid solution before the process of concentration in the usual manner and the removal of the precipitated sulphides by filtration or sedimentation. The dilute silution is now ready for the evaporator where it is to be concentrated according to the usual process of manufacture. At this point, and during the process of evaporation, I slowly introduce a small amount of hydrogen sulphide or a solution of a soluble sulphide. The solution in the evaporator by this process is kept saturated to a greater or less degree with sulphide whereby further impurities may be precipitated during the process of concentration and at the same time if the evaporator is lined with lead or some acid resisting alloy containing this metal or similar metals, the interior of the apparatus is kept continuously coated with a film of sulphide which is insoluble in the phosphoric acid and prevents the hot phosphoric acid in the evaporator from attacking the metal or metals, of which the apparatus is formed, to any appreciable extent. At the same time, any impurities in the phosphoric acid solution are necessarily precipitated by the sulphide and if the evaporator is provided with a suitable portion where sedimentation can take place, the sulphides which are to be precipitated and removed by my process can settle during the early stages of the evaporation while the solution is not in a concentrated condition, thus avoiding the effect of the viscosity which prevents easy sedimentation or filtration if the concentrated phosphoric acid is treated with hydrogen sulphide or a soluble sulphide to remove these impurities when the solution is in a concentrated condition.

My invention therefore contemplates the treatment of dilute phosphoric acid solutions before and during the process of concentration whereby the impurities are precipitated and removed while the solution is still dilute and the lining of the apparatus is protected by a film of sulphide to prevent further solution of the material of which the container is made during the higher stages of concentration.

I find that if the dilute phosphoric acid solution has been thoroughly treated with sulphide before taken to the evaporator, that as small an amount as 10 pounds of sodium sulphide or the equivalent of hydrogen sulphide added gradually as a dilute solution to 10,000 gallons of phosphoric acid is sufficient to maintain the original purity of the solution during the process of concentration.

What I therefore claim and desire to secure by Letters Patent is:

1. In the manufacture of phosphoric acid, those steps which consist in adding relatively small amounts of a soluble sulphide to the dilute acid prior to concentration and in then evaporating in a vessel having a corrodable lining while gradually adding more sulphide to the acid as it concentrates.

2. The process of maintaining phosphoric acid pure during evaporation in apparatus having a corrodable lining which consists in introducing a soluble sulphide into the dilute acid prior to concentration and in then boiling the acid to concentrate while maintaining its saturation with the sulphide.

3. The process of maintaining phosphoric acid pure during evaporation in apparatus having a corrodable lining which consists in introducing a soluble sulphide into the dilute acid prior to concentration and in then boiling to concentrate while continuously adding more sulphide in small amounts.

In testimony whereof I affix my signature.

AUGUSTUS H. FISKE.